US011623248B2

(12) United States Patent
Kim et al.

(10) Patent No.: US 11,623,248 B2
(45) Date of Patent: Apr. 11, 2023

(54) FOCUSED ULTRASOUND TRANSDUCER WITH ELECTRICALLY CONTROLLABLE FOCAL LENGTH

(71) Applicant: UNIVERSITY OF SOUTHERN CALIFORNIA, Los Angeles, CA (US)

(72) Inventors: Eun Sok Kim, Rancho Palos Verdes, CA (US); Lurui Zhao, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 513 days.

(21) Appl. No.: 16/747,868

(22) Filed: Jan. 21, 2020

(65) Prior Publication Data

US 2020/0230650 A1 Jul. 23, 2020

Related U.S. Application Data

(60) Provisional application No. 62/794,168, filed on Jan. 18, 2019.

(51) Int. Cl.
*B06B 1/00* (2006.01)
*G01S 15/00* (2020.01)
*B06B 1/06* (2006.01)

(52) U.S. Cl.
CPC .................................. *B06B 1/0696* (2013.01)

(58) Field of Classification Search
None
See application file for complete search history.

(56) References Cited

U.S. PATENT DOCUMENTS

2005/0288680 A1* 12/2005 Ingle ...................... A61N 1/403 128/898
2009/0171255 A1* 7/2009 Rybyanets ............... A61N 7/02 601/3

(Continued)

FOREIGN PATENT DOCUMENTS

CN 110235022 A * 9/2019 ......... G01S 15/8925
WO WO-0150810 A1 * 7/2001 ........... B06B 1/0688

OTHER PUBLICATIONS

Lee, C-Y. et al., "Acoustic Ejector with Novel Lens Employing Air-Reflectors", in IEEE International Micro Electro Mechanical Systems Conference, Istanbul, Turkey, Jan. 22-26, 2006, pp. 170-173.

(Continued)

*Primary Examiner* — James R Hulka
(74) *Attorney, Agent, or Firm* — Brooks Kushman P.C.

(57) ABSTRACT

A focused ultrasonic transducer includes a piezoelectric substrate having a first face and a second face, a back metal layer disposed over the first face, and a patterned metal layer disposed over the second face. The patterned metal layer includes a first plurality of concentric ring electrodes wherein each of the first plurality of concentric ring electrodes are wired to be individually accessible. A controller actuates a subset of the concentric ring electrodes such that electrical control of focal length is achieved by selecting a group of electrodes to actuate so that acoustic waves generated from selected electrodes arrive at a desired focal length in-phase and interfere constructively to create a focal spot of high acoustic intensity. The patterned metal layer optionally includes a first central electrode that is surrounded by the first plurality of concentric ring electrodes.

18 Claims, 12 Drawing Sheets

(56) References Cited

U.S. PATENT DOCUMENTS

| | | | | |
|---|---|---|---|---|
| 2009/0182237 | A1* | 7/2009 | Angelsen | B06B 1/064 600/459 |
| 2009/0230823 | A1* | 9/2009 | Kushculey | B06B 1/0637 310/366 |
| 2009/0281463 | A1* | 11/2009 | Chapelon | G10K 11/32 601/2 |
| 2010/0049186 | A1* | 2/2010 | Ingle | A61B 18/1485 606/33 |
| 2011/0319793 | A1* | 12/2011 | Hynynen | A61N 7/02 601/2 |
| 2012/0176002 | A1* | 7/2012 | Kim | H04R 3/04 310/317 |
| 2015/0133716 | A1* | 5/2015 | Suhami | H04R 25/00 607/57 |
| 2016/0022490 | A1* | 1/2016 | Ergun | A61F 9/00745 600/439 |
| 2017/0328870 | A1* | 11/2017 | Garlepp | G10K 11/346 |
| 2017/0330552 | A1* | 11/2017 | Garlepp | B06B 1/0629 |
| 2017/0335685 | A1* | 11/2017 | Breaux | E21B 49/00 |
| 2018/0349663 | A1* | 12/2018 | Garlepp | G06V 40/1306 |
| 2019/0005300 | A1* | 1/2019 | Garlepp | G06V 40/1306 |
| 2019/0076114 | A1* | 3/2019 | Sammoura | A61B 8/12 |
| 2020/0316586 | A1* | 10/2020 | Riaud | G01N 29/2437 |

OTHER PUBLICATIONS

Zhao, L. et al., "Focused Ultrasonic Transducer with Electrically Controllable Focal-Point Location", Ultrasonics Symposium (IUS) 2018 IEEE International, pp. 1-3, 2018.

Zhao, L. et al., "Focused ultrasound transducer with electrically controllable focal length" 2018 IEEE Micro Electro Mechanical Systems (MEMS), Belfast, Northern Ireland, UK, Jan. 21-25, 2018, pp. 245-248.

* cited by examiner

FOCUSED ULTRASOUND TRANSDUCER WITH ELECTRICALLY CONTROLLABLE FOCAL LENGTH

CROSS-REFERENCE TO RELATED APPLICATIONS

This application claims the benefit of U.S. provisional application Ser. No. 62/794,168 filed Jan. 18, 2019, the disclosure of which is hereby incorporated in its entirety by reference herein.

STATEMENT REGARDING FEDERALLY SPONSORED RESEARCH OR DEVELOPMENT

The invention was made with Government support under Contract No, R21EB022932 awarded by the National Institutes of Health. The Government has certain rights to the invention.

TECHNICAL FIELD

In at least one aspect, the present invention is related to focused ultrasound transducers.

BACKGROUND

Focused ultrasound (FUS) has a wide application potential in imaging, tumor treatment, neuron stimulation, etc. However, all the previously designed single-element transducers are of a fixed focal length, with no electrical controllability for the focal length, and are incapable of dynamically changing the focal spot without physically moving the transducer.

SUMMARY

In at least one aspect, the present invention solves one or more problems of the prior art by providing a focused ultrasound transducer with electrically controllable focal length. Advantageously, the transducer described herein offers a tremendous degree of operating freedom by enabling the electrical controllability of the focal length based on selection of a set of the transducer's ring electrodes. By using the new design, a real-time, fast-response, on-demand changing of focal length can be achieved. In a variation, air cavity shielding is used to solve the asymmetric issue introduced by electrode routing.

In another aspect, a focused ultrasonic transducer is provided. The focused ultrasonic transducer includes a piezoelectric substrate having a first face and a second face, a back metal layer disposed over the first face, and a patterned metal layer disposed over the second face. The patterned metal layer includes a first plurality of concentric ring electrodes wherein each concentric ring electrode of the first plurality of concentric ring electrodes are wired to be individually accessible. A controller actuates a subset of the concentric ring electrodes such that electrical control of focal length is achieved by selecting a group of electrodes to actuate so that acoustic waves generated from selected electrodes arrive at a desired focal length in-phase and interfere constructively to create a focal spot of high acoustic intensity. The patterned metal layer optionally includes a first central electrode that is surrounded by the first plurality of concentric ring electrodes.

In another aspect, an acoustic transducer capable of delivering a focused acoustic beam with electrically tunable focal length range over 7 mm is provided. Built on a 1.02 mm thick lead zirconate titanate (PZT) substrate, one version of the transducer uses a collection of equal-width-equal-spacing concentric ring electrodes (and a circular electrode at the center) on one side of the substrate. With each electrode individually addressable, a desired focal length is mapped to a set of the electrodes generating the acoustic waves that arrive at the focal point in-phase for constructive interference. A device capable of electrically tuning the focal length (of a focal spot of sub-mm in diameter) from 5 to 12 mm is demonstrated experimentally, with the electrical tunability confirmed through droplet ejection from liquid surface (that is at the focal plane), as the liquid level is varied.

DETAILED DESCRIPTION

Figure 1A:
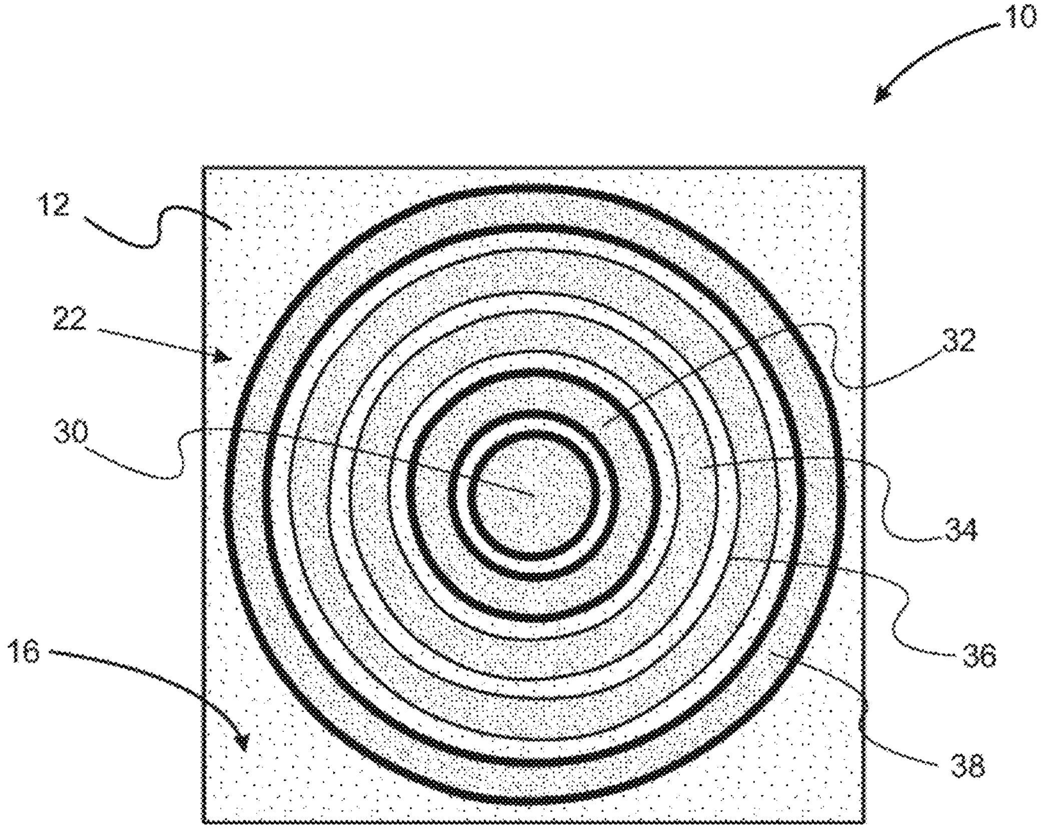
FIG. 1A: Top-view schematic of a 4-bit resolution acoustic transducer. Four equal-width concentric ring electrodes are patterned on PZT. Each electrode can be actuated individually. By varying the selection of the electrodes to be actuated, the focal length can be varied.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means including or consisting of. Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100, Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

Throughout this application, where publications are referenced, the disclosures of these publications in their entireties are hereby incorporated by reference into this application to more fully describe the state of the art to which this invention pertains.

Abbreviations:

"DRIE" means deep reactive ion etching.

"PMN-PT" means $Pb(Mg_{1/3}Nb_{2/3})O_3$-$PbTiO_3$,

"PZT" means lead zirconate titanate.

In an embodiment, a focused ultrasonic transducer with electrically controllable focal length is provided. With reference to FIGS. 1A, 1B, 1C, 1D schematic illustrations of a focused ultrasonic transducer are provided. Focused ultrasonic transducer 10 generates acoustic waves that are focused on a focal point FP with a focal length FL. Focused ultrasonic transducer 10 includes a piezoelectric substrate 12. Piezoelectric substrate 12 can be in the form of a plate, sheet or film. Characteristically, piezoelectric substrate 12 has an ultrasonic fundamental thickness-mode resonant frequency. In a refinement, piezoelectric substrate 12 has a fundamental thickness-mode resonant frequency from about 0.5 to 900 MHz. Examples of materials of which focused piezoelectric substrate 12 can be composed of include, but are not limited to, PZT, PMN-PT, lithium niobate, ZnO, AlN, and the like. Piezoelectric substrate 12 includes a first face 14 opposite to a second face 16. First face 14 can be the back face and second face 16 can be the front face as depicted in FIG. 1B. In this context, the front face is the face closest to focal point FP. Alternatively, first face 14 can be the front face and second face 16 can be the back face.

Figure 1B:
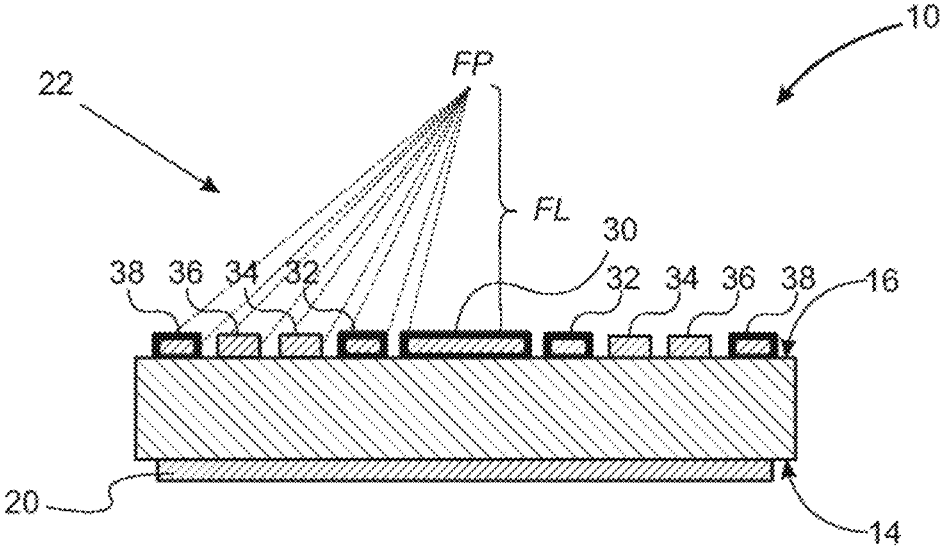
FIG. 1B: Cross-sectional view of the acoustic transducer of FIG. 1A.

With reference to FIGS. 1A and 1B, back metal layer 20 (i.e., a back electrode) is disposed over (and typically contacts) the first face 14 and a patterned metal layer 22 is disposed over (and typically contacts) second face 16. The patterned metal layer 22 includes a first plurality of concentric ring electrodes 30-36. The ring electrodes can be in the form of circles (i.e., circular) or circular arcs. In a refinement, the concentric ring electrodes are sectored into a pie shape formed by circular arcs. In a variation, focused ultrasonic transducer 10 has a first central electrode 38 surrounded by the first plurality of concentric ring electrodes 30-36. First central electrode 38 can be in the form of a circular ring or a circular disk. Characteristically, each of the first plurality of concentric ring electrodes 30-36 and first central circular electrode 38 when present is wired to be individually accessible. In a refinement, each wire of a first plurality of wires 40 contacts one of the first plurality of concentric ring electrodes 30-36 and first central electrode 38. Each wire of the first plurality of wires 40 and therefore the electrodes are individually accessible. Moreover, each wire of the first plurality of wires 40 can be at least partially disposed over (and typically contacts) one or both of first face 14 and second lace 16. In a refinement, a wire can pass between first face 14 and second face 16 through via 42.

Figure 1C:
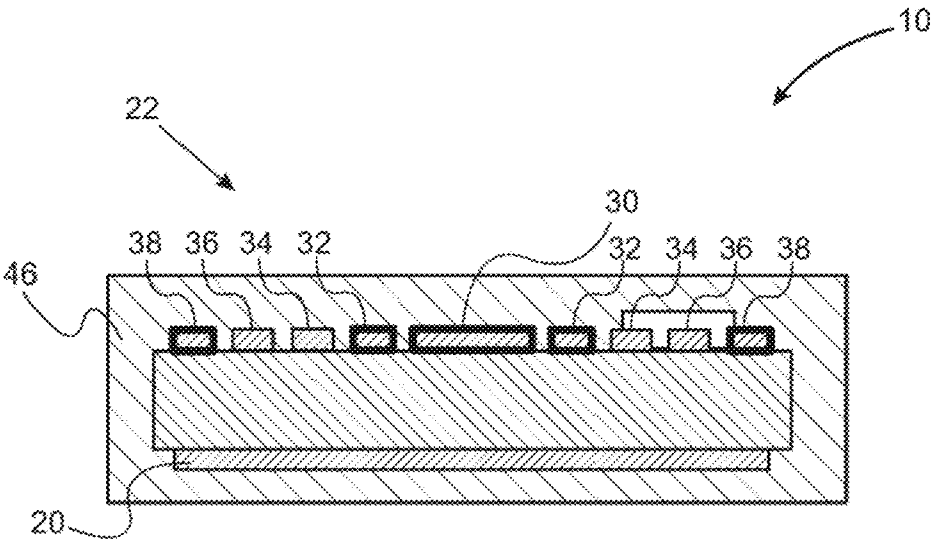
FIG. 1C: Cross-sectional view of the acoustic transducer of FIG. 1 encapsulated in a protective material.

FIG. 1C provides a variation where Focused ultrasonic transducer 10 is encapsulated with a protective material 46. Examples of such protective encapsulants include, but are not limited to, polymers such as Parylene. In a refinement, the focused ultrasonic transducer further includes air cavities 48 within the protective material 46 which block acoustic waves in the region (and its conjugate region) where concentric ring electrodes are disturbed for electrical wiring-outs.

Figure 1D:
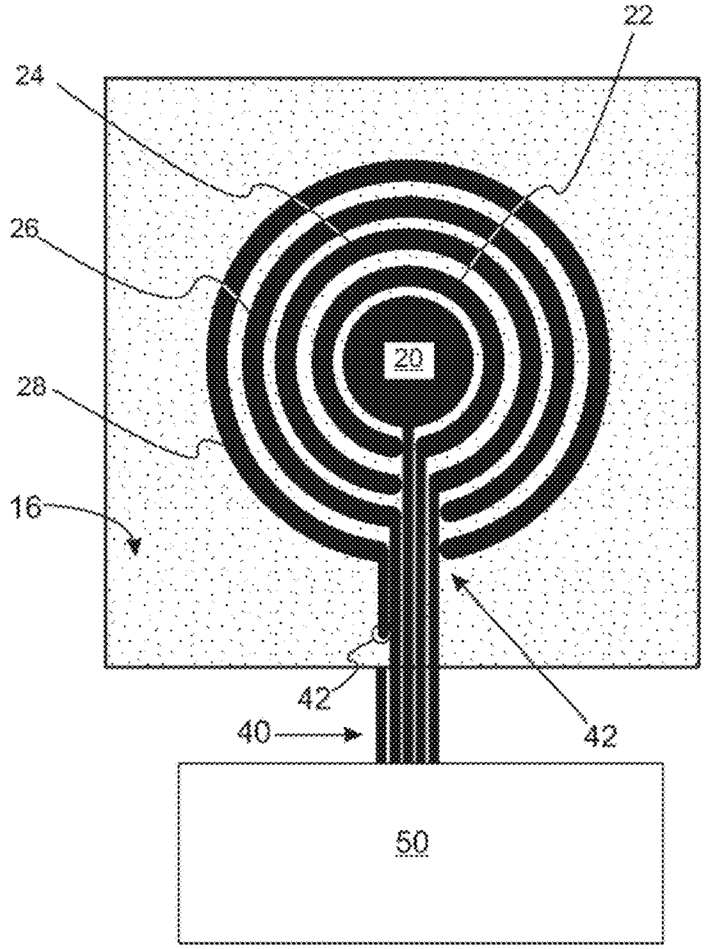
FIG. 1D: Top-view of an acoustic transduce showing connection to a controller.

With reference to FIG. 1D, a controller 50 is used to actuate a subset of the first central circular electrode and the concentric ring electrodes such that electrical control of focal length is achieved by selecting a group of electrodes to actuate so that acoustic waves generated from selected electrodes arrive at a desired focal length FL in-phase and interfere constructively to create a focal spot FP of high acoustic intensity. In FIGS. 1A, 1B, and 1C, the electrodes shown with thicker lines are selected. The present invention is not limited by any particular value of the focal length. For example, the focal length can be from 0.1 to 200 mm are obtainable.

Figure 1E:
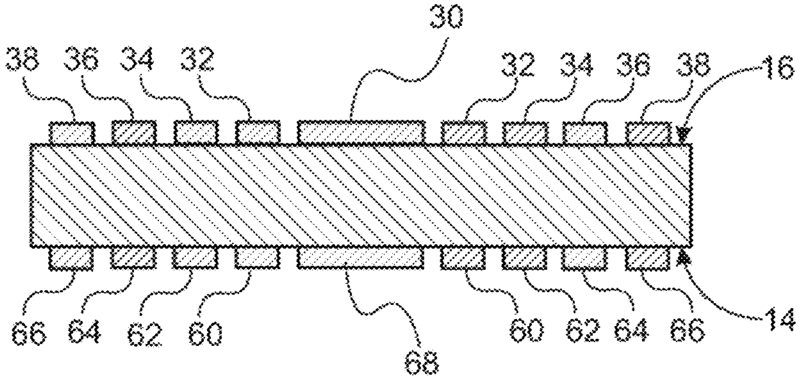
FIG. 1E: Cross-sectional of an acoustic transduce having a patterned electrode on the front and back faces.

In a variation as depicted in FIG. 1E, the back metal layer 20 is a second patterned metal layer that includes a second plurality of concentric ring electrodes 60-66. In a refinement, second central electrode 68 is surrounded by the second plurality of concentric ring electrodes 60-66. As set forth above, second central electrode 68 can be a circular ring or a circular disk. In a refinement, each of the second plurality of the concentric ring electrodes and the second central electrode 68 when present is wired to be individually accessible either on an electrode face or on the other face through via. As set forth above, in this variation each of the second plurality of concentric ring electrodes and second central circular electrode when present is wired to be individually accessible. In a refinement, each wire of the second plurality of wires contacts one of the second plurality of concentric ring electrodes and second central electrode when present. Each wire of the second plurality of wires and therefore the electrodes are individually accessible. Moreover, each wire of the second plurality of wires can be at least partially disposed over (and typically contacts) one or both of first face 14 and second face 16. In a refinement, a wire can pass between first face 14 and second face 16 through vias as set forth above.

Figure 2:
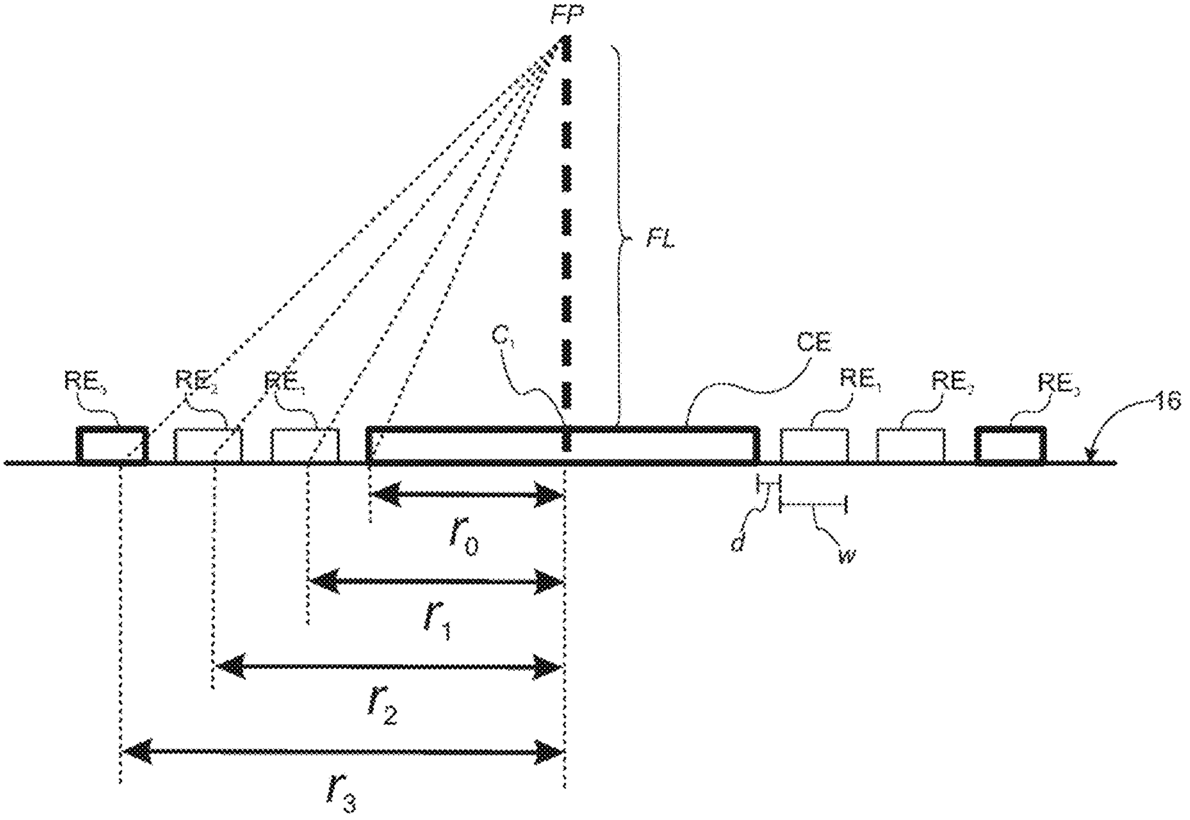
FIG. 2: The radius of the circular center electrode $r_0$ determines lower bound of the focal length approximately. The $n^{th}$ radius $r_n$ is used to determine if the $n^{th}$ ring electrode needs to be actuated for a particular focal length.

FIG. 2 provides a cross-section of a portion of acoustic transducer 10 showing the dimensions of the electrodes. In this figure, the electrode shown with thicker lines are selected. In a refinement, the radius $r_0$ of a central electrode CE can be from 1 mm to 50 mm. Radii $r_1$, $r_2$, $r_3$, . . . $r_n$, are the distances of the center of ring electrodes $RE_1$, $RE_2$, $RE_3$ . . . $RE_n$, from a center $C_1$ of first central electrode CE where n is the total number of ring electrodes. In a refinement, ring electrodes $RE_1$, $RE_2$, $RE_3$ . . . $RE_n$ are separated by a distance d from about 0.003 to 5 mm while the width of each ring electrode can be from 0.003 to 5 mm. In a refinement, the ring electrodes are equally spaced and have the same widths w. It should be appreciated that central electrodes CE correspond to the central electrodes of FIGS. 1A-1E while the ring electrodes $RE_1$, $RE_2$, $RE_3$ . . . correspond to the concentric ring electrodes of FIGS. 1A-1E. It should also be appreciated that the present invention is not limited by the number of ring electrodes, the number of ring electrodes in the first plurality of concentric ring electrodes and the second plurality of concentric ring electrodes can each independently be from 3 to 128, Advantageously, the total number of electrodes on second face 16 equals the total bits for controlling the focal length. Similarly, when back metal layer 20 is a second patterned layer, the sum of the total number of electrodes on first face 14 and second face 16 equals the total bits for controlling the focal length. Therefore, focused ultrasonic transducer 10 provides a bit resolution for controlling precision. In a refinement, the concentric ring electrodes have approximately an equal width or different widths optimized for precision on focal length control.

Similarly, the present invention is not limited by the type of metal used to form the ring electrodes or the central electrodes. However, gold and platinum group metals such as aluminum, nickel, platinum, and palladium are particularly useful.

Additional details of the present invention are found in Lurui Zhao, Eun Sok Kim, "Focused Ultrasonic Transducer with Electrically Controllable Focal-Point Location", Ultrasonics Symposium (IUS) 2018 IEEE International, pp. 1-3, 2018 and Lurui Zhao; Eun Sok Kim "Focused ultrasound transducer with electrically controllable focal length" 2018 IEEE Micro Electro Mechanical Systems (MEMS); the entire disclose of these publications is hereby incorporated by reference.

The following examples illustrate the various embodiments of the present invention. Those skilled in the art will recognize many variations that are within the spirit of the present invention and scope of the claims.

In one example, the transducer is built on a 1.02 mm thick PZT substrate, whose fundamental thickness-mode resonant frequency is 2.25 MHz. Two layers of nickel sputtered on both sides which serve as electrodes. Ultrasonic waves are generated at the areas covered by patterned nickel electrodes due to the PZT's piezoelectric effect. The electrode patterns are designed to have one (1) circular center and thirty-one (31) concentric equal-width annular rings (outside the center electrode), for a total of 32 electrodes. Each and every one of the 32 patterned electrodes is wired out to a pad with individual accessibility. The radius of the circular center electrode is 2 mm, while the width of each of the annular rings is 0.2 mm with equal spacing of 0.05 mm between two adjacent electrodes.

Electrical controlling the focal length is achieved by selecting a group of electrodes to actuate so that the acoustic waves generated from those selected electrodes will arrive at the desired focal length in-phase, interfere constructively, and create a foal spot of high acoustic intensity. As each electrode can be selected or unselected, the 32 electrodes give a 32-bit resolution of controlling precision. FIG. 1A illustrates a 4-bit transducer. Higher bit resolution will give more precise control over the focal length.

The radius of the circular center electrode $r_0$ approximately defines the lower bound of focal length, as suggest by:

$$f_{min} = \frac{\sqrt{r_0^2 + \lambda^2/4}}{\lambda} \tag{1}$$

For the $n^{th}$ ring electrode, we use its central radius (average of inner and outer radius) to calculate the contribution to the focal point according to their phase factor (P.F.):

$$P.F. = \sin\left(\frac{\sqrt{r_n^2 + f^2} - f}{\lambda} \cdot 2\pi\right) \tag{2}$$

Figure 3:
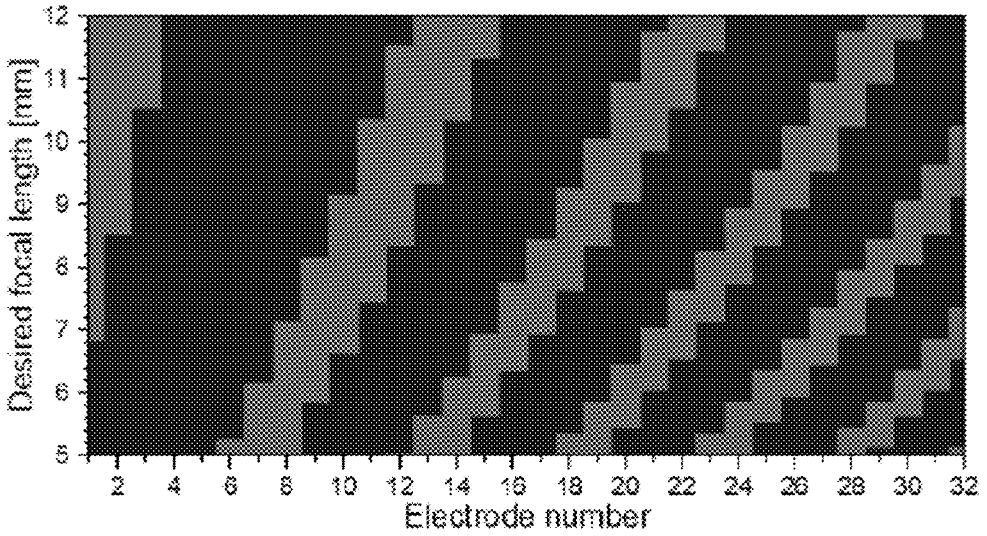
FIG. 3: A plan for selecting the actuation group of the electrodes for a 32-bit resolution transducer. The darker blocks mean the corresponding $n^{th}$ electrode rings are selected for actuation, while the lighter ones mean unselected.

If the contribution is positive for in-phase constructive interference, we will add this electrode into the group of the electrodes to be actuated. Otherwise (i.e., out-of-phase destructive interference), we will not select the ring to actuate. FIG. 3 demonstrates the actuation selection group based on our 32-bit transducer design. As we vary the focal length, the actual focal size will change accordingly: a shorter focal length will result in a smaller focal size, while a longer focal length will induce a larger focal size.

Simulation on particle displacement (that is directly related to acoustic intensity) is carried out to verify the initial design as well as the capability to control the focal length. A C++ finite element modeling (FEM) program has been coded based on the piezoelectricity and acoustics, and data visualization has been achieved by another Python program. To make a clear demonstration of the electrical controllability of the focal length, we choose 4 typical focal lengths (5, 7, 10, and 12 mm) to run the simulation. For the four cases, we simulate on the same electrode patterning (32-bit) but different sets of the actuated electrodes from FIG. 3.

Figure 4:
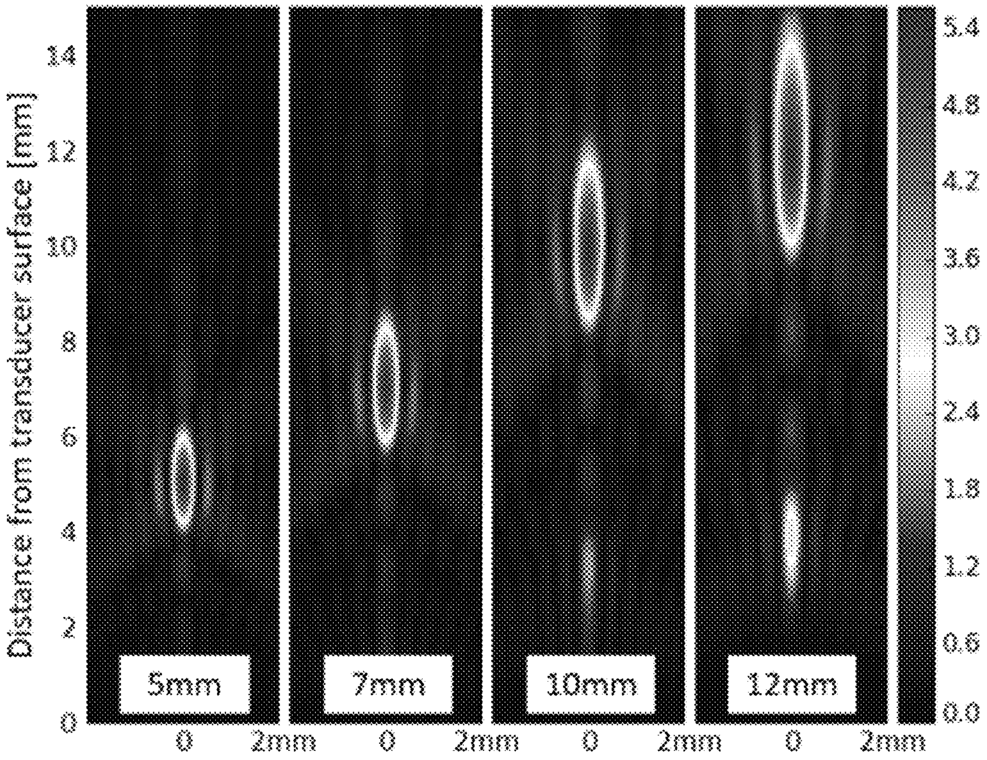
FIG. 4: Simulation results showing the focal effect and focal length of 5, 7, 10 and 12 mm.

The simulated results on the vertical cross-sectional particle displacement are shown in FIG. 4 for each of the four focal-length actuating selections. Focal effects are significant with an elliptical focal depth at the desired focal length. The particle displacement at the focal spot is about 10 times larger than the average value of the particle displacements in the rest of the region. As expected, the focal size is dependent on the focal length.

Figure 5:
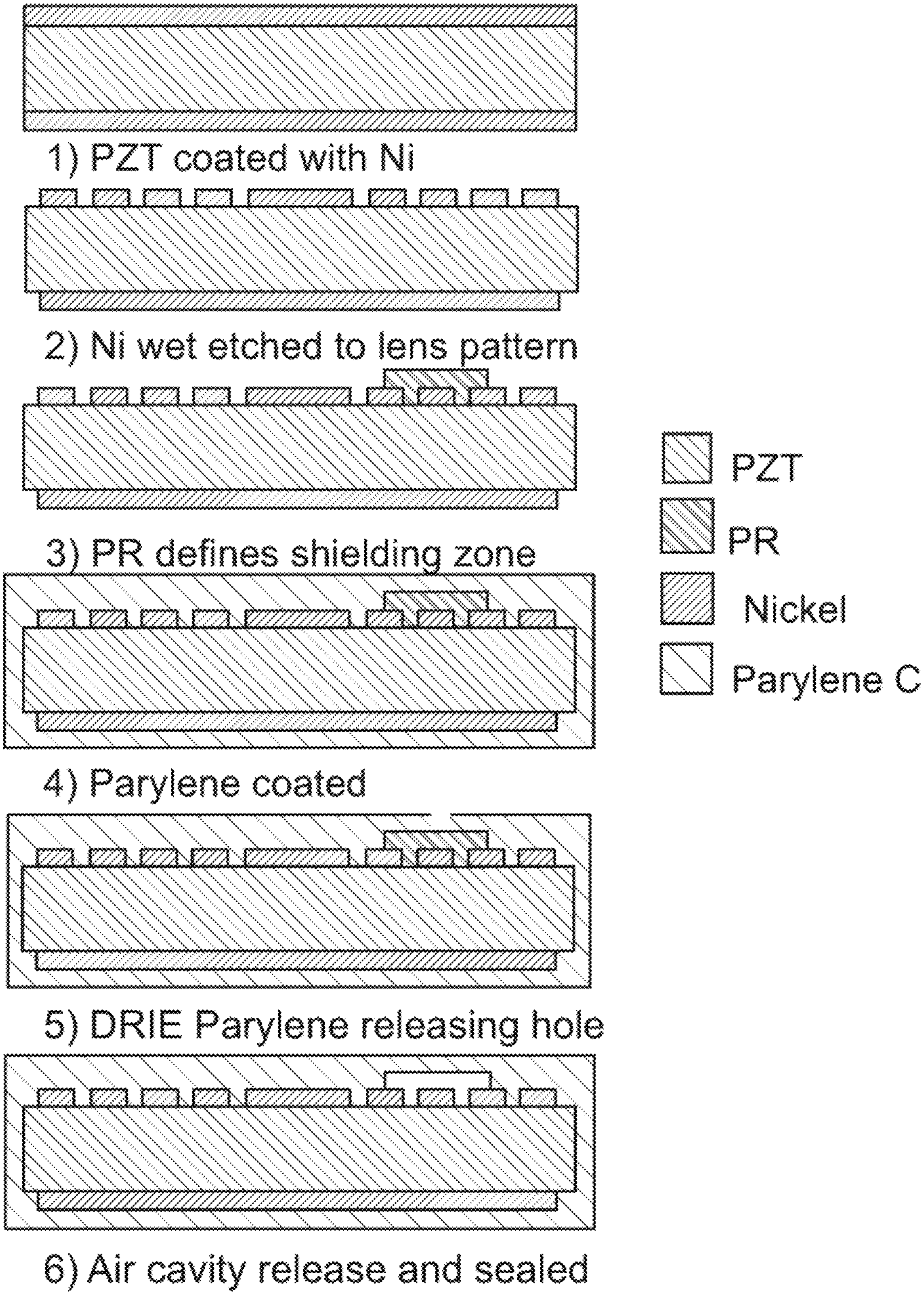
FIG. 5: Fabrication process of the transducer.
Figure 6:
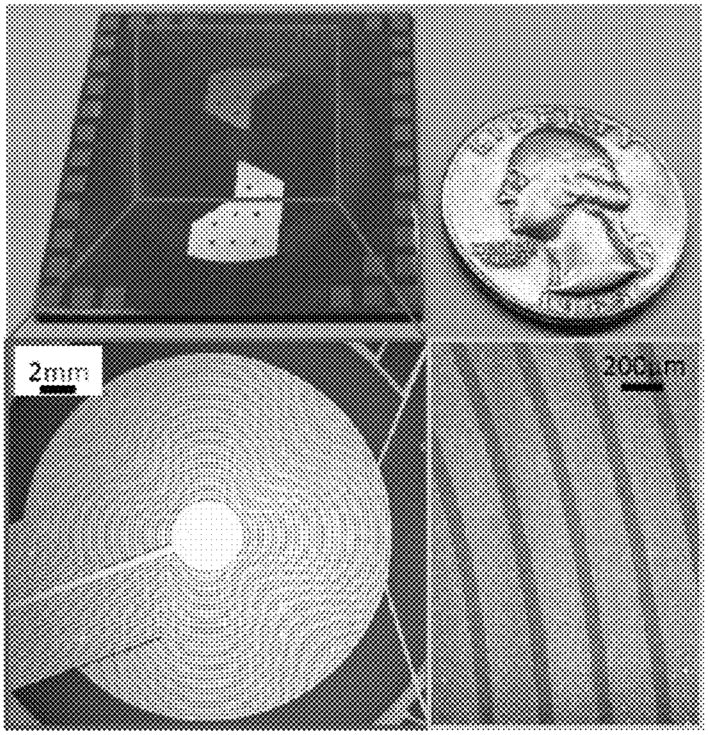
FIG. 6: Photos of the fabricated transducer. The top photo shows the transducer after releasing sacrificial photoresist layer for air reflector region which shelters the asymmetric electrode part. The $O_2$ plasma etched release holes can be clearly seen. The bottom photos show the close-up views of the patterned electrodes.

A brief fabrication process is illustrated in FIG. 5. We start with a 1.03 mm thick. PSI-5A4E PZT sheet with nickel layer sputter-deposited on its both sides. AZ5214 photoresist is coated for both the front and back sides for the electrode pattern delineation. Front-to-back alignment is done by aligning at the pre-defined dicing edge of PZT sheet. The electrode wiring-outs are patterned on the front side. After the wet etch of nickel layer, a second layer of photoresist is spin-coated fiber a sacrifice layer in forming air cavities which block acoustic waves in the region (and its conjugate region) where annular rings are disturbed for electrical wiring-outs (so that the acoustic-wave sources may be circumferentially symmetric). Then, with the protection of the backside electrode, a 6 μm thick. Parylene film is deposited, and release holes are defined on the front side Where air cavities are needed. Oxygen reactive ion etch (RIE) is used to etch through the Parylene to form the release holes, and the sacrificial layer is removed by acetone through the release holes. A second layer of Parylene film is, then, deposited to seal the holes to finish the air-cavity reflectors and provide the transducer with electrical insulation for liquid immersive operations. The finished transducer is shown in FIG. 6.

Different packages may be used for different applications. We build an acrylic handler to house the transducer and position it underwater for verifying the focal length through droplet ejection experiment. Reservoir based package is also adopted for other application and operation.

EXPERIMENTAL RESULTS

We use water-droplet ejection to verify the focal length, focal size, and electrical-focal-length controllability. When the liquid level is right at the focal plane, the water within the focal spot will receive an intensified acoustic energy from the focused ultrasound, which leads to ejection of water droplets. By observing the droplet ejection, we can measure the focal length from the water height at which the droplet ejection occurs (as the focused ultrasound is the one that causes the ejection) and the lateral focal size (which is closely related to the droplet size).

Figure 7:
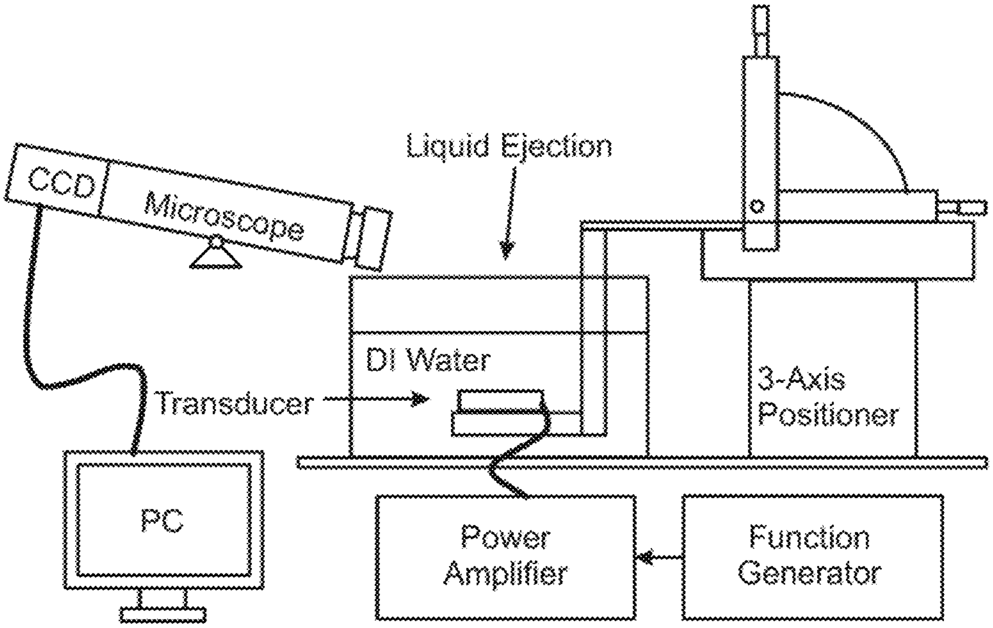
FIG. 7: Measurement setup schematics for droplet ejection experiment. Droplet ejection can be observed by CCD camera, while the foal length can be measured with the micropositioner.

FIG. 7 illustrates the measurement setup schematics for our transducer. The function generator outputs the driving waveform of a pulsed sinusoidal wave of 2.25 MHz, 200 pulse cycles at a pulse repetition frequency of 60 Hz, which then is amplified to around 430 $V_{pp}$ by a power amplifier. A 3-axis positioner holds the acrylic handler to position the transducer within the water. A CCD camera is attached to a long-range microscope for observing the droplet ejection from the side, with a synchronized delay-adjustable light strobing with light-emitting-diode (LED) working as a stroboscope for capturing the ejection process at various points in time.

When our transducer is positioned at the desired focal length under the water surface, the droplet ejection occurs, and the water height is recorded as the transducer's focal length. By changing the delay from the stroboscopic LED to the moment when the droplet ejection starts (after necking of a water column), we measure the lateral size of the droplet.

Figure 8:
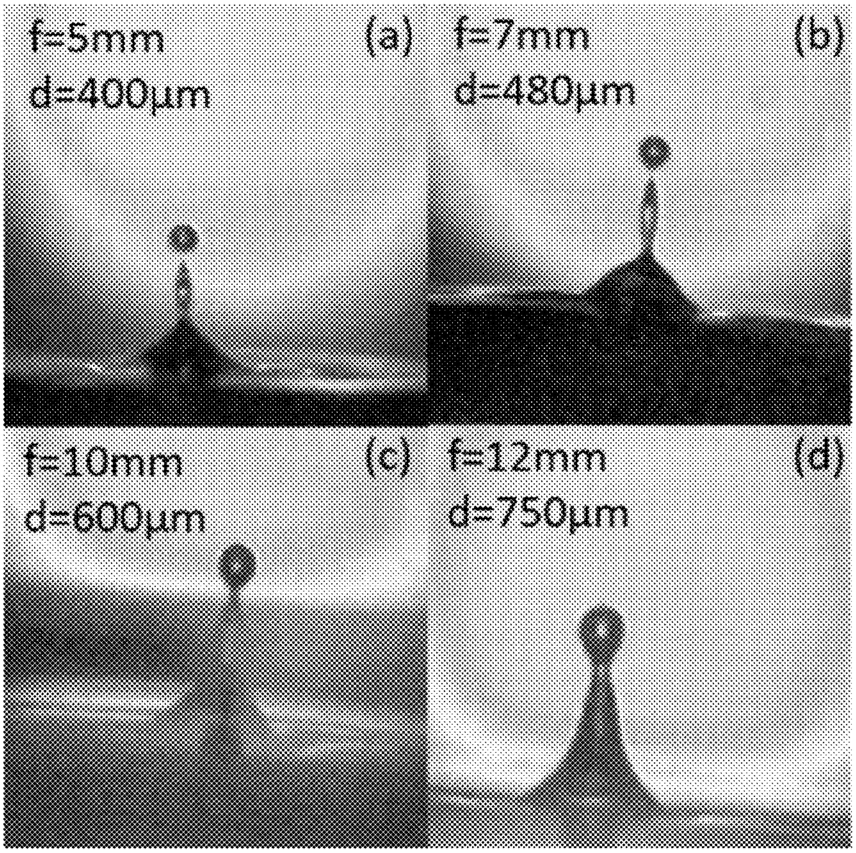
FIG. 8: Cross-sectional-view photos of the water ejections obtained at the water heights of 5 mm (a), 7 mm (b), 10 mm (c), and 12 mm (d).
Figure 9:
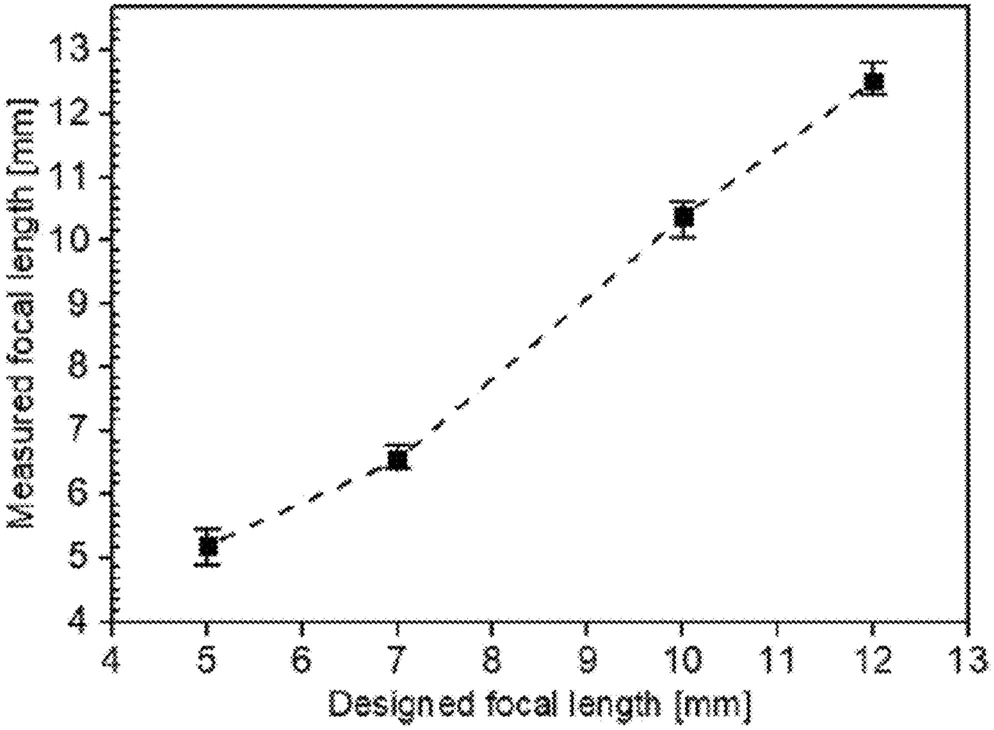
FIG. 9: Measured local lengths vs designed focal lengths.
Figure 10:
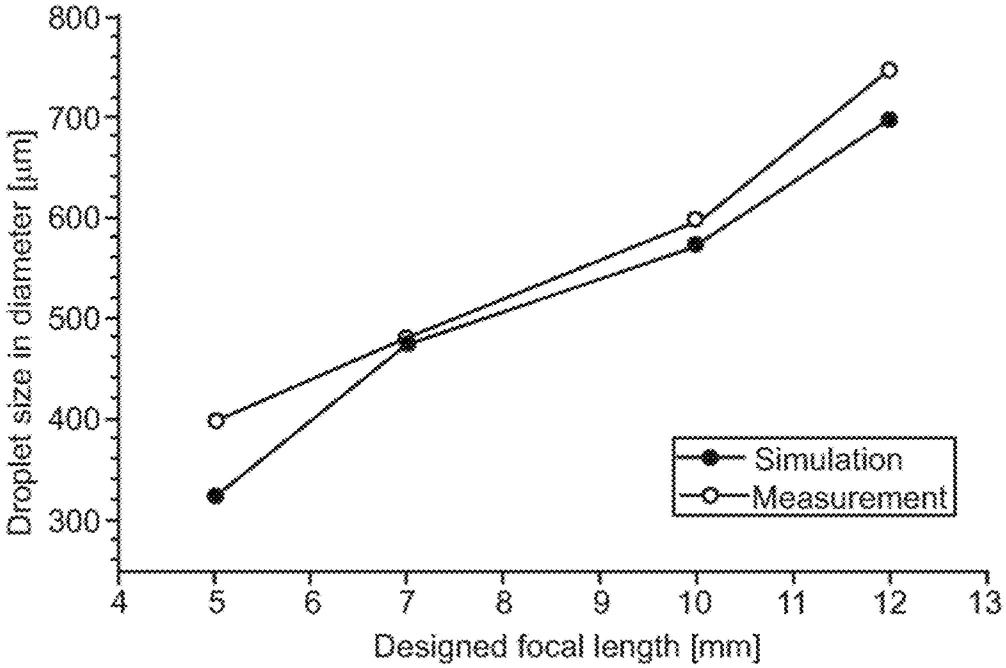
FIG. 10: Ejected droplet size vs designed focal length (both measured and simulated data).

Each of the photos in FIG. 8 shows the necking of the water column just before a droplet is ejected. The diameter of the droplet is measured from the captured video. The water height is read out from the positioner. The graph in FIG. 9 shows the relation between the designed focal length (by the actuation plan) versus the measured focal length. The graph in FIG. 10 summarizes the measured lateral dimensions of the droplets in FIG. 8 with respect to the set focal lengths, as well as the simulated focal sizes from our C++ program.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A focused ultrasonic transducer comprising:
   - a piezoelectric substrate having a first face and a second face;
   - a back metal layer disposed over the first face;
   - a patterned metal layer disposed over the second face, the patterned metal layer including a first plurality of concentric ring electrodes wherein each concentric electrode of the first plurality of concentric ring electrodes is wired to be individually accessible; and
   - a controller that actuates a subset of the concentric ring electrodes such that focal length electrical control is achieved by selecting a group of electrodes to actuate so that acoustic waves generated from selected electrodes arrive at a desired focal length in-phase and interfere constructively to create a focal spot of high acoustic intensity.

2. The focused ultrasonic transducer of claim 1 further comprising a first central electrode that is surrounded by the first plurality of concentric ring electrodes.

3. The focused ultrasonic transducer of claim 2 wherein the first central electrode is a circular ring or a circular disk.

4. The focused ultrasonic transducer of claim 1 wherein the concentric ring electrodes are sectored into a pie shape.

5. The focused ultrasonic transducer of claim 1 wherein the piezoelectric substrate or film comprises lead zirconate titanate, PMN-PT, lithium niobate, ZnO, AlN, AlScN, and combinations thereof.

6. The focused ultrasonic transducer of claim 1 wherein the piezoelectric substrate or film has an ultrasonic fundamental thickness-mode resonant frequency.

7. The focused ultrasonic transducer of claim 1 wherein the piezoelectric substrate or film has a fundamental thickness-mode resonant frequency from about 0.5 to 900 MHz.

8. The focused ultrasonic transducer of claim 1 wherein the focused ultrasonic transducer uses a bit resolution for controlling precision with the number of control bits being equal to the total number of electrodes on the first face.

9. The focused ultrasonic transducer of claim 1 wherein the first plurality of concentric ring electrodes includes from 3 to 128 concentric ring electrodes.

10. The focused ultrasonic transducer of claim 1 wherein the concentric ring electrodes have approximately an equal width.

11. The focused ultrasonic transducer of claim 1 wherein the concentric ring electrodes have different widths optimized for precision on focal length control.

12. The focused ultrasonic transducer of claim 1 further comprising a protective material encapsulating the focused ultrasonic transducer with air cavities within the protect material that block acoustic waves in a region and/or a conjugate region where the concentric ring electrodes are disturbed for electrical wiring-outs.

13. The focused ultrasonic transducer of claim 1 wherein the back metal layer is a second patterned metal layer including a second plurality of concentric ring electrodes wherein each concentric electrode of the second plurality of concentric ring electrodes is wired to be individually accessible.

14. The focused ultrasonic transducer of claim 13 wherein the back metal layer further includes a second central electrode that is surrounding by the second plurality of concentric ring electrodes.

15. The focused ultrasonic transducer of claim 14 wherein the second central electrode is a circular ring or a circular disk.

16. The focused ultrasonic transducer of claim 14 wherein the concentric ring electrodes are sectored into a pie shape.

17. The focused ultrasonic transducer of claim 14 wherein the focused ultrasonic transducer uses a bit resolution for controlling precision with the number of control bits being equal to the sum of the total number of electrodes on the first face plus the total number of electrodes on the second face.

18. A focused ultrasonic transducer comprising:
   - a piezoelectric substrate having a first face and a second face;
   - a back metal layer disposed over and contacting the first face;
   - a patterned metal layer disposed over the second face, the patterned metal layer including a first plurality of concentric ring electrodes wherein each concentric electrode of the first plurality of concentric ring electrodes is wired to be individually accessible;
   - a first central electrode that is surrounded by the first plurality of concentric ring electrodes; and
   - a controller that actuates a subset of the concentric ring electrodes such that focal length electrical control is achieved by selecting a group of electrodes to actuate so that acoustic waves generated from selected electrodes arrive at a desired focal length in-phase and interfere constructively to create a focal spot of high acoustic intensity.

* * * * *